United States Patent
Qin et al.

(10) Patent No.: US 9,593,185 B2
(45) Date of Patent: Mar. 14, 2017

(54) SUSPENSION OF SOLID CATALYST COMPONENT USED IN PROPYLENE POLYMERIZATION, METHOD OF PREPARING THE SAME, AND METHOD OF PROPYLENE POLYMERIZATION

(71) Applicants: China Petroleum & Chemical Corporation, Beijing (CN); Sinopec Catalyst Co., Ltd., Beijing (CN); Beijing Research Institute of Chemical Industry, China Petroleum & Chemical Corporation, Beijing (CN)

(72) Inventors: Jinlai Qin, Beijing (CN); Haixiang Cui, Beijing (CN); Xiaodong Wang, Beijing (CN); Mingzhi Gao, Beijing (CN); Cuiling Xiao, Beijing (CN); Yanju Sun, Beijing (CN); Liang Pan, Beijing (CN); Xin Chen, Beijing (CN); Ziqiang Wang, Beijing (CN)

(73) Assignees: China Petroleum & Chemical Corporation, Beijing (CN); Sinopec Catalyst Co., Ltd., Beijing (CN); Beijing Research Institute Of Chemical Industry, China Petroleum & Chemical Corporation, Beijing (CN)

(*) Notice: Subject to any disclaimer, the term of this patent is extended or adjusted under 35 U.S.C. 154(b) by 17 days.

(21) Appl. No.: 14/561,617

(22) Filed: Dec. 5, 2014

(65) Prior Publication Data

US 2015/0158961 A1 Jun. 11, 2015

(30) Foreign Application Priority Data

Dec. 6, 2013 (CN) .......................... 2013 1 0656121

(51) Int. Cl.
*C08F 110/06* (2006.01)

(52) U.S. Cl.
CPC .................................. *C08F 110/06* (2013.01)

(58) Field of Classification Search
CPC ....................................................... C08F 110/06
See application file for complete search history.

(56) References Cited

U.S. PATENT DOCUMENTS

2003/0149199 A1* 8/2003 Schottek ................. C07F 17/00
526/126
2007/0155616 A1* 7/2007 Wang ...................... C08F 10/00
502/103

FOREIGN PATENT DOCUMENTS

CN 1927440 A 3/2007
CN 102218277 A 10/2011

* cited by examiner

*Primary Examiner* — Catherine S Branch
(74) *Attorney, Agent, or Firm* — Buchanan Ingersoll & Rooney PC

(57) ABSTRACT

The present disclosure provides a suspension of a solid catalyst component used in propylene polymerization and a method for preparing the same. The suspension includes the solid catalyst component and a liquid medium containing propylene and an alkane, and is preferably prepared by mixing the solid catalyst component and the alkane to obtain a mixed slurry, which is further mixed with liquid propylene. Using of a proper liquid dispersing agent at a proper proportion and amount enables the solid catalyst component to be more homogeneously dispersed, thus preventing the phenomenon of agglomeration in the polymerization process without using a large amount of the dispersing agent or any additional mixer. The present disclosure further provides a method of propylene polymerization, including feeding the suspension into a reaction system of propylene polymerization, wherein propylene polymerization is initiated under polymerization conditions.

20 Claims, No Drawings

SUSPENSION OF SOLID CATALYST COMPONENT USED IN PROPYLENE POLYMERIZATION, METHOD OF PREPARING THE SAME, AND METHOD OF PROPYLENE POLYMERIZATION

FIELD OF THE INVENTION

The present disclosure relates to a suspension of a solid catalyst component used in propylene polymerization, a method of preparing the same, and use thereof. The present disclosure further relates to a method of propylene polymerization.

BACKGROUND OF THE INVENTION

A catalyst used in propylene polymerization is usually of high activity, and therefore should be added into a polymerization reactor in a stable, continuous, and tiny flow. Hence, it further requires that a catalyst suspension should be dispersed as homogeneously as it can be. Otherwise, locally rapid polymerization reaction, incompatibility between heat release and heat removal during reaction, and agglomeration on the reactor would occur, thus affecting stability of production. Therefore, one of the key technologies in a propylene polymerization process is to allow the catalyst to be sufficiently dispersed so as to feed it into the reactor in a stable, continuous, and tiny flow.

CN 1927440A provides a method of feeding a slurry of catalyst in a stable and homogeneous flow at an accurate quantity, comprising the step of feeding the slurry through a catalyst tank, a six-way valve, a quantitative tube, and a circulatory system of nitrogen in a feeding device. The method has the benefit of stable feeding, with decreased amount of sediment and reduced variation of concentration during transportation. The major problem of the method lies in that static aggregation of solid particles during preparation of the slurry of catalyst would result in the phenomenon of inhomogeneity of the slurry of catalyst. Moreover, when this method is used in industrial production, revamping of the process apparatus is largely required.

CN 102218277A provides a method for preparing a slurry with fragile particles and a viscous liquid. In this method, the phenomenon of particle breakage during dispersion and preparation of the slurry is eliminated. However, due to a density difference and other property differences between solid particles and a liquid, the slurry is insufficiently stable, and the method fails to provide any special technology that can solve the problem of inhomogeneous dispersion caused by particle aggregation.

Currently, three methods are used for dispersing a catalyst in industrial propylene gas phase polymerization. In the first method, a solid particle catalyst and liquid propylene are mixed on site of an apparatus (e.g., a Novolen propylene polymerization apparatus). According to the feeding mode of this method, a solid catalyst bucket is connected to a catalyst storage tank of a polypropylene production apparatus. The solid catalyst is fed into the catalyst storage tank through a pipe and a valve under the function of gravity. The catalyst storage tank is then added with liquid propylene to prepare a catalyst slurry of a certain concentration, which is fed into a polymerization reactor in a controlled flow. This method is beneficial in that the raw material propylene is used as a dispersing medium of the catalyst, without introducing any other component. Nevertheless, there exist the following problems in this method. At the outset, the work of catalyst preparation is rather labor intensive, with high operative risks when the catalyst bucket is lifted by a worker. Next, liquid propylene is of low viscosity and the catalyst particles settle easily, which causes the concentration of the slurry to be inhomogeneous with large fluctuation. Consequently, the amount of the catalyst entering the reactor becomes instable, causing abnormity in the reactor. Moreover, the solid catalyst component cannot be readily dispersed in liquid phase propylene in a homogeneous manner, with the phenomenon of particle aggregation and agglomeration, causing unstable amounts of the catalyst entering the reactor. As a result, violent reaction occurs locally in the reactor, generating lump materials which affect stability of the production. In formulating the solid catalyst component and liquid propylene, in order to reduce the phenomenon of agglomeration, enhanced stirring can be used. However, the catalyst particles are fragile, and would be inevitably broken under too large shearing forces, which would further affect the polymerization process. In the second method, the catalyst in solid particles and mineral oil are respectively added into a catalyst storage tank and dispersed on site of an apparatus (e.g., a Novolen propylene polymerization apparatus), and then the resulting slurry is directed into the propylene polymerization reactor. The formulation of this method is similar to that of the first method, wherein a solid catalyst bucket needs to be connected to a catalyst tank, followed by addition of mineral oil. After a catalyst slurry is formulated, it is fed into a polymerization reactor at a controlled flow and impact with propylene therein to initiate a polymerization reaction. As a benefit of this method, mineral oil with a certain viscosity is selected to formulate a catalyst slurry with good stability. However, this method is also inevitably labor intensive, with large operative risks as in the case of the first method. Furthermore, the second method has the following major problems. First, since the catalyst is required to be added into the polymerization reactor at a low concentration, a large amount of mineral oil is necessary, which increases the costs. Second, a high viscosity of the mineral oil prevents the solid catalyst particles from being readily dispersed in a homogeneous manner in a short time. When the catalyst is added into the reactor, inhomogeneous heat release and large fluctuation of temperature may occur, which affects stability of the production. In the third dispersion method, a slurry of catalyst in mineral oil from a supplier is directly used to catalyze propylene polymerization. The slurry is transported to the site of an apparatus and fed into a catalyst tank (e.g., an INNOVENE propylene polymerization apparatus) for direct use, without having to establish a separate catalyst dispersing system. Nonetheless, this method is inapplicable to some gas phase polymerization processes which require a low concentration of feeding materials, such as Novelen propylene polymerization. Furthermore, a high content of mineral oil used in this method also causes the same problems as those existing in the second method.

The industrial production practice and existing literature reports at present still reveal a need to develop a method of dispersing a solid catalyst component used in propylene polymerization more homogeneously, so as to transport the catalyst component to a polymerization reactor in a stable, continuous, and homogeneous manner, thus enabling more stable and longer operation of the reaction system and improvement of polymer properties.

SUMMARY OF THE INVENTION

To solve the problems and meet the requirements in the prior art, the present disclosure aims to provide a suspension of a solid catalyst component used in propylene polymerization. In the suspension, the solid catalyst component used in propylene polymerization is homogeneously dispersed into a liquid medium, which ensures the catalyst can be introduced into a polymerization reactor in a stable, continuous, and tiny flow.

The present disclosure further provides a method for preparing the suspension of the solid catalyst component used in propylene polymerization. This method is simple but effective in obtaining a homogenously dispersed suspension of the solid catalyst component.

The present disclosure further provides use of the suspension of the solid catalyst component in propylene polymerization.

The present disclosure further provides a method for propylene polymerization and polypropylene material obtained therefrom.

According to the present disclosure, a suspension of a solid catalyst component used in propylene polymerization is provided, wherein said suspension comprises said solid catalyst component and a liquid medium containing propylene and an alkane used for dispersing said solid catalyst component.

It can be easily understood that said alkane can be linear alkane and/or a cycloalkane, wherein the linear alkane can be straight or branched.

A rather wide scope of alkanes can be applied to the present disclosure. Preferably, said alkane of the present disclosure can be at least one selected from a group consisting of $C_6$-$C_{100}$ alkanes, more preferably at least one selected from a group consisting of $C_7$-$C_{70}$ alkanes, and further preferably at least one selected from a group consisting of $C_7$-$C_{40}$ alkanes, for example at least one selected from a group consisting of $C_7$-$C_{12}$ alkanes. Said alkane can, for example, be at least one selected from a group consisting of hexane, heptane, octane, decane, and dodecane.

According to some embodiments of the present disclosure, mineral oil can be used as a source of the alkane. Hence, in one preferred embodiment, said liquid medium can comprise propylene and mineral oil, or can be a mixed liquid of propylene and mineral oil.

According to some embodiments of the present disclosure, said alkane can preferably be mineral oil containing a $C_7$-$C_{12}$ alkane. Hence, in one preferred embodiment, said liquid medium can comprise propylene and mineral oil containing a $C_7$-$C_{12}$ alkane.

It is well known in the art that mineral oil mainly comprises alkanes (including linear alkanes and cycloalkanes). In the present disclosure, mineral oil comprises more than 90% of alkanes, and optionally comprises a small amount of inevitable impurities such as aromatic hydrocarbons.

According to the present disclosure, white oil can also be used as a source of the alkane. Hence, in one preferred embodiment, said liquid medium comprises propylene and white oil. One skilled in the art knows that white oil substantially comprises alkanes (including linear alkanes and cycloalkanes), and that said alkanes mainly refer to $C_{20}$-$C_{40}$ alkanes.

The inventors of the present disclosure have found that, when a dispersing medium prepared by an alkane of a certain viscosity, especially a mixture of $C_7$-$C_{40}$ alkanes, and propylene of a low viscosity is used as a dispersing agent of a solid catalyst component for propylene polymerization, the dispersibility among the particles of the solid catalyst component for propylene polymerization can be improved, thus reducing static aggregation among the particles of the solid catalyst component for propylene polymerization. Hence, agglomeration of the catalyst component can be prevented. Moreover, the surface of the catalyst component can be wrapped by an alkane having a certain viscosity, which may not only protect the active center of the catalyst, but also slowly release the activity of the catalyst to a certain extent, thus avoiding agglomeration of the catalyst caused by excessive activity thereof. As a result, a mixed slurry of higher stability can be obtained.

In order to better disperse the solid catalyst component in the liquid medium, and considering costs at the same time, the weight ratio of the propylene to the alkane in the suspension of the present disclosure is preferably in the range from 0.1:1 to 45:1, further preferably from 1:1 to 30:1, more preferably from 2:1 to 18:1, and further preferably from 4:1 to 15:1.

According to the present disclosure, the weight ratio of the solid catalyst component to the alkane is preferably in the range from 1:0.5 to 1:20, preferably from 1:1 to 1:10, and more preferably from 1:1.5 to 1:4. The above ranges can ensure satisfactory dispersion of the solid catalyst component without using a large amount of alkanes which would otherwise increase costs.

In the present disclosure, said solid catalyst component used in propylene polymerization can be a commonly used catalyst component in the art, generally containing magnesium, titanium, a halogen, and an internal electron donor.

Generally, said solid catalyst component can be a reaction product among a titanium compound, a magnesium compound, and an electron donor.

According to the present disclosure, said magnesium compound can be at least one selected from a group consisting of the magnesium compounds as shown in formula (I): $MgR^4R^5$, and hydrates and alcoholates thereof.

In formula (I), $R^4$ and $R^5$, independent of each other, both can be selected from a group consisting of halogens, $C_1$-$C_5$ straight or branched alkoxyl groups, and $C_1$-$C_5$ straight or branched alkyl groups. In the present disclosure, said magnesium compound can preferably be at least one selected from a group consisting of magnesium dichloride, magnesium dibromide, magnesium diiodide, alcoholates of magnesium dichloride, alcoholates of magnesium dibromide, and alcoholates of magnesium diiodide, more preferably at least one selected from a group consisting of magnesium dichloride, magnesium dibromide, and magnesium diiodide, and most preferably magnesium dichloride.

According to the present disclosure, said titanium compound can be a compound as shown in formula (II): $TiX_m(OR^6)_{4-m}$.

In formula (II), m is an integer from 1 to 4; X is a halogen, and $R^6$ is identical or different $C_1$-$C_{20}$ hydrocarbyl groups. It can be readily understood, by different groups of $R^6$, it refers to the following conditions, i.e., when m equals 1 or 2, there can be three or two $OR^6$ groups, which can be identical to or different from one another. In the present disclosure, said titanium compound can preferably be at least one selected from a group consisting of titanium tetrachloride, titanium tetrabromide, titanium tetraiodide, tetrabutoxy titanium, tetraethoxy titanium, triethoxy titanium chloride, dichlorodiethoxy titanium, and trichloroethoxy titanium, more preferably titanium tetrachloride.

According to the present disclosure, said internal electron donor can be any one of various electron donors commonly used in the art, such as at least one selected from a group consisting of aliphatic ethers, cycloaliphatic ethers, aliphatic ketones, and monobasic acid esters or polybasic acid esters formed from aliphatic or aromatic carboxylic acids.

Said aliphatic ethers, cycloaliphatic ethers, aliphatic ketones, and monobasic acid esters or polybasic acid esters formed from aliphatic or aromatic carboxylic acids each can be a compound conventionally used in the art, such as a $C_2$-$C_6$ aliphatic ether, a $C_3$-$C_4$ cyclic ether, a $C_3$-$C_6$ saturated aliphatic ketone, a $C_1$-$C_4$ alkyl ester of a $C_1$-$C_4$ saturated aliphatic acid, a $C_1$-$C_4$ alkyl ester of a $C_7$-$C_8$ aromatic acid, and the like.

Specifically, said internal electron donor can, for example, be at least one selected from a group consisting of benzoates, phthalates, 1,3-malonates, succinates, and the above organic ethers, preferably at least one selected from a group consisting of diisobutyl phthalate, di-n-butyl phthalate, di-isooctyl phthalate, 2,4-pentanediol dibenzoate, 3,5-heptanediol dibenzoate, 9,9-dimethyl methoxyl fluorene, 2-isopropyl-2-isopentyl-dimethoxypropane, 2,2-diisobutyl-dimethoxypropane, and 2,3-dipropyl-1,4-diethyl succinate.

According to the present disclosure, a method for preparing the suspension of the solid catalyst component for propylene polymerization as described above is provided. The method comprises dispersing said solid catalyst component into the liquid medium containing propylene and the alkane to form the suspension. In a preferred embodiment of the present disclosure, the method comprises the following steps: 1) mixing the solid catalyst component and a dispersant which contains the alkane to form a mixed slurry, the alkane accounting for more than 98% of said dispersant; and 2) mixing said mixed slurry and liquid propylene to form said suspension.

In some embodiments, the solid catalyst component can be first mixed with an alkane. The resulting mixture is then absorbed or pressed into a catalyst storage tank of a reaction system, followed by addition of a certain amount of liquid propylene for dilution and mixing to obtain said suspension. Alternately, the solid catalyst component can be first mixed with the alkane, and then mixed with liquid propylene to obtain a suspension, which is absorbed or pressed into the catalyst storage tank of the reaction system for use. Furthermore, the solid catalyst component, the alkane, and liquid propylene can be added into the storage tank of an existing olefin polymerization apparatus and mixed. Additional device is unnecessary in the existing olefin polymerization apparatus, thus saving the costs of devices. In addition, preparing the suspension by mixing in one and the same mixer would not affect dispersion of the particles or the subsequent polymerization, which constitutes one significant advantage of the present disclosure.

In one preferred embodiment of the present disclosure, the method comprises the following steps: 1) adding a mixed slurry of the solid catalyst component and the alkane directly into a catalyst storage tank of a propylene polymerization apparatus, or adding the solid catalyst component and the alkane respectively into the catalyst storage tank of the propylene polymerization apparatus and mixing the same to obtain a mixed slurry; and 2) adding liquid propylene which is to be mixed with the mixed slurry to obtain said suspension. In this connection, the propylene polymerization apparatus is a commonly used one in the art, comprising a catalyst storage tank and a propylene polymerization reactor, wherein a catalyst is directly introduced into the propylene polymerization reactor from the catalyst storage tank without arrangement of any additional mixer therebetween. A prominent benefit of the present disclosure lies in that the suspension of solid catalyst component can be prepared in an existing industrial propylene polymerization apparatus and then introduced into the propylene polymerization reactor from the catalyst storage tank, requiring no additional mixer in front of or behind the existing catalyst storage tank.

As described above, the alkane in step 1) can be a linear alkane and/or a cycloalkane, wherein the linear alkane can be a straight or branched alkane. The alkane can preferably be at least one selected from a group consisting of $C_6$-$C_{70}$ alkanes, more preferably at least one selected from a group consisting of $C_7$-$C_{40}$ alkanes. In some preferred embodiments, the alkane can be from mineral oil or white oil.

The preferred embodiments above according to the present disclosure have the following advantages. At the outset, the solid catalyst component can be sufficiently mixed up with the alkane so as to be preliminarily dispersed in and wrapped up by the alkane. As a result, the active center of the catalyst can be protected to some extent and the activity of the catalyst can be slowly released to a certain degree, thus preventing locally violent reaction which would otherwise lead to agglomeration. Moreover, introduction of the alkane would not affect the propylene polymerization reaction. Next, a certain amount of propylene is added in step 2) to adjust the viscosity of the dispersing liquid medium, which enables the solid catalyst component to be further dispersed. Furthermore, addition of propylene as a reaction monomer in this step without introducing any other material can reduce the concentration of the catalyst component without increasing costs of the solvent.

According to the present disclosure, the mixing temperature in step 1) preferably ranges from 30 to 90° C., more preferably from 60 to 80° C. This temperature range of 30 to 90° C. enables the solid catalyst component to be better dispersed into and wrapped up by the alkane. Further preferably, step 1) is performed under stirring at a speed preferably in a range from 10 to 50 rpm.

According to the method of the present disclosure, for the sake of more homogeneous dispersion, economy, and simple operation, the concentration of the catalyst component in the mixed slurry obtained in step 1) ranges from 20 to 40 wt %, and the weight ratio of the propylene to the mixed slurry in step 2) ranges from 3:1 to 10:1. Under these conditions, the solid catalyst component can be satisfactorily dispersed without using a large amount of solvent, thus saving costs of fund and operation.

As described above, a solid catalyst component prepared into a slurry (comprising a dispersing agent and a solid catalyst component used in propylene polymerization) is commercially available at present. The solid catalyst component is generally dispersed into mineral oil at a concentration in a range from 20 to 35 wt %, which is far higher than the corresponding concentration applicable to propylene polymerization. Moreover, the solid catalyst component cannot be well dispersed at such a high concentration and thus settle easily, which is disadvantageous to the propylene polymerization.

According to another embodiment of the present disclosure, the above commercially available slurry can be directly used, which precedes addition of propylene at an amount as described above, so as to obtain the suspension of solid catalyst component of the present disclosure. This embodiment is beneficial in that the existing slurry of solid catalyst can be directly used, so that preparation of a mixture of the solid catalyst component and the alkane will be unnecessary. Compared with the prior art, the catalyst component of the present disclosure can be directly absorbed or pressed into a catalyst storage tank of the reaction system. Liquid propylene at an amount according to the present disclosure can be further added to obtain the suspension, thus saving the work of lifting a catalyst barrel in case a catalyst powder is used, which is both labor intensive and dangerous.

According to the method of the present disclosure, steps 1) and 2) can be carried out in one and the same mixer, or can be carried out in separate mixers. Satisfactory dispersing effects can be achieved even using one and the same mixer for preparation. The mixer can be a container commonly used in the prior art industrial production that can achieve a purpose for mixing, preferably with a stirring device.

The inventors of the present disclosure have discovered that the above suspension of solid catalyst component of the present disclosure, or the above method for preparing the suspension of solid catalyst component of the present disclosure is particularly applicable to propylene gas phase polymerization, especially the NOVOLEN propylene gas phase polymerization process.

The present disclosure further provides a method for propylene polymerization, comprising feeding the above suspension of solid catalyst component, or the suspension prepared by the above method for preparing suspension of solid catalyst component into a propylene polymerization reaction system, adding an aluminum alkyl compound and an external electron donor into the system, and initiating propylene polymerization under polymerization conditions.

Specifically, in one embodiment of the present disclosure, the method for propylene polymerization, comprising the steps of:
  a) mixing a solid catalyst component and a dispersant which contains a alkane to form a mixed slurry, the alkane accounting for more than 98% of said dispersant;
  b) mixing said mixed slurry and liquid propylene to form a suspension;
  c) introducing the suspension into a propylene polymerization system;
  d) adding an aluminum alkyl compound and an external electron donor into the system; and
  e) initiating propylene polymerization under polymerization conditions.

In the method for propylene polymerization according to the present disclosure, the weight ratio of the propylene to the alkane is preferably in the range from 0.1:1 to 45:1, further preferably from 1:1 to 30:1, more preferably from 2:1 to 18:1.

In the method for propylene polymerization according to the present disclosure, the concentration of the solid catalyst component in the mixed slurry of step a) preferably ranges from 20 to 40 wt %, and the weight ratio of the propylene to the mixed slurry in step b) preferably ranges from 3:1 to 10:1.

The solid catalyst component suspension used in propylene polymerization and the method of preparing the same provided in the present disclosure can improve the dispersing effect of the catalyst component in mixing the solid particles of the catalyst and liquid propylene or in mixing the solid particles of the catalyst and mineral oil in site of the apparatus, and improve homogeneity of catalyst flows entering the reactor. On the other hand, due to the alkane contained in the surface bores of the catalyst, the activity center of the catalyst can be protected to a certain degree, which can ease the influences imposed by fluctuation of the mass of propylene. As a result, the activity of the catalyst can be stably released, thus rendering the reaction of polymerization stable and reducing the phenomenon of agglomeration in the polymerization reactor.

According to the present disclosure, the preferred polymerization conditions of the above method comprise a temperature in the range from 0 to 150° C., more preferably from 30 to 90° C., a pressure in the range from 0.1 to 10 MPa, more preferably from 1.0 to 5.0 MPa, and a reaction period in the range from 0.5 to 5 h, more preferably 1 to 4 h.

According to the method for propylene polymerization of the present disclosure, the aluminum alkyl compound can be a commonly used one in the art.

Preferably, the aluminum alkyl compound of the present disclosure can be at least one selected from a group of compounds having a general formula of $AlR^1_n X^1_{3-n}$, with "n" equaling 2 or 3, "$R^1$", identical to or different from one another, being hydrogen or a $C_1$-$C_{20}$ straight or branched alkyl group, and "$X^1$" being a halogen, preferably chlorine, bromine, or iodine, and more preferably chlorine.

More preferably, the aluminum alkyl compound can be at least one selected from a group consisting of triethyl aluminum, tripropyl aluminum, tri-n-butyl aluminum, triisobutyl aluminum, tri-n-octyl aluminum, triisobutyl aluminum, diethylaluminum monohydride, diisobutylaluminum monohydride, diethylaluminum monochloride, diisobutylaluminum monochloride, ethylaluminum sesquichloride, and ethylaluminum dichloride.

Most preferably, the aluminum alkyl compound can be triethyl aluminum and/or triisobutyl aluminum.

According to the method for propylene polymerization of the present disclosure, the external electron donor can be at least one selected from a group of compounds having a general formula of $R^2_p Si(OR^3)_{4-p}$, with "p" as an integer in the range from 0 to 3, "$R^2$", identical to or different from one another (i.e., when p equals 2 or 3, these two or three $R^2$ can be identical to or different from one another), being selected from a group consisting of $C_1$-$C_{10}$ straight or branched alkyl groups, substituted or unsubstituted $C_3$-$C_{10}$ cyclic hydrocarbyl groups, substituted or unsubstituted $C_6$-$C_{12}$ aryl groups, and $C_1$-$C_{10}$ halogenated alkyl groups, and "$R^3$", identical to or different from one another, being selected from a group consisting of halogens, hydrogen, $C_1$-$C_{10}$ straight or branched alkyl groups, substituted or unsubstituted $C_3$-$C_{10}$ cyclic alkyl groups, substituted or unsubstituted $C_6$-$C_{12}$ aryl groups, and $C_1$-$C_{10}$ halogenated alkyl groups.

The substituted or unsubstituted $C_3$-$C_{10}$ cyclic hydrocarbyl groups are preferably substituted or unsubstituted cyclohexyl groups, or substituted or unsubstituted piperidinyl groups, such as cyclohexyl, 4-methyl-cyclohexyl, 4-ethyl-cyclohexyl, 4-n-propyl-cyclohexyl, 4-n-butyl-cyclohyxyl, piperidinyl, and 2-ethyl-piperidinyl.

More preferably, the external electron donor can be at least one selected from a group consisting of cyclohexyl methyl dimethoxy silane, diisopropyl dimethoxy silane, di-n-butyl-dimethoxy silane, diisobutyl dimethoxy silane, diphenyl dimethoxy silane, methyl tert-butyl dimethoxy silane, dicyclopentyl dimethoxy silane, 2-ethyl piperidinyl-2-tert-butyl dimethoxy silane, (1,1,1-trifluoro-2-propyl)-2-ethyl piperidinyl dimethoxy silane, and (1,1,1-trifluoro-2-propyl)-methyl dimethoxy silane.

Most preferably, the external electron donor can be cyclohexyl methyl dimethoxy silane.

The present disclosure further provides a polypropylene material prepared by the method as provided above by the present disclosure.

The polymer powder obtained according to the method for propylene polymerization of the present disclosure has homogeneous particle size distribution. The content of small-size particles is relatively low, which benefits long-term operation of the production apparatus, and also further production of propylene copolymers. In addition, the content of large-size particles is also low, which indicates little agglomeration in the products, further benefiting stable operation of the polymerization system.

According to the solid catalyst component suspension used in propylene polymerization and the method of preparing the same provided by the present disclosure, use of a proper variety of liquid dispersing medium at a proper proportion and amount enables the solid catalyst component to be more homogeneously dispersed in the liquid dispersing medium of a certain viscosity, avoiding the phenomenon of particle aggregation or agglomeration. The liquid dispersing medium having a relatively high viscosity can wrap up the solid catalyst component, thus protecting the active center of the catalyst. Besides, the activity of the catalyst can be slowly released, thus avoiding locally violent reaction which would otherwise lead to agglomeration. Moreover, a large amount of a liquid dispersing medium, especially a liquid dispersing medium component other than the polymerization monomer, is not needed to satisfy a low concentration of the catalyst for propylene polymerization, and to achieve homogeneous dispersion of the catalyst at the same time. As a result, a large amount of the organic solvent can be saved, thus reducing costs. The suspension provided in the present disclosure can be obtained from a few raw materials accessible readily through a preparation method that can be simply and easily performed as provided by the present disclosure, wherein unexpected technical effects can be produced.

It should be noted that the prominent advantage of the present disclosure further lies in that due to the fact that a proper variety of liquid dispersing medium and proper proportion and amount thereof, as well as a proper proportion with the solid catalyst component for propylene polymerization are applied, an additional mixer would be unnecessary in an existing propylene polymerization apparatus for mixing the solid catalyst component and the dispersing medium, or for mixing propylene and the mixed slurry which contains the solid catalyst component. Hence, the method of the present disclosure allows low costs of the apparatus, and thus has significant industrial application values.

According to the method for propylene polymerization of the present disclosure, use of the homogeneously dispersed solid catalyst component suspension according to the present disclosure enables the catalyst to be added into the polymerization reaction in a continuous, stable, and homogeneous flow, thus greatly increasing stability and security in operation of the propylene polymerization reaction system. As a result, polypropylene material having satisfactory properties can be obtained.

DETAILED DESCRIPTION OF THE EMBODIMENTS

The present disclosure will be explained by reference to the following detailed description of embodiments, whereby it can be understood more readily how to solve the technical problem by the technical means according to the present disclosure and achieve the technical effects thereof, and thus the technical solution according to the present disclosure can be implemented. It is important to note that as long as there is no conflict, combinations of the examples of the present disclosure and technical features therein can be combined with one another, and technical solutions obtained in this manner are intended to be within the scope of the present disclosure.

Example 1

In a storage tank of an existing gas phase propylene polymerization apparatus which allows continuous reaction, commercially available white oil No. 68, (substantially comprising $C_{20}$-$C_{40}$ alkanes including cycloalkanes) as a dispersing medium, was heated up to 100° C., removed of impurities of oxygen, water, and the like contained therein by repeated vacuum pumping and supplement of nitrogen, and then cooled down to 70° C. Solid catalyst BCND-F (SIMOPEC CATALYAT CO., LTD) was added at this temperature under stirring in such an amount as to enable the concentration of the solid catalyst to be 30 wt %. After 4 hours of stirring, the temperature was lowered to room temperature and a mixed slurry was obtained.

Liquid propylene was added into the mixed slurry and mixed with the slurry to obtain a suspension of solid catalyst, wherein the weight ratio of the liquid propylene to the mixed slurry was 6:1.

The suspension of solid catalyst was introduced into a polymerization reactor. At the same time, other polymeric materials (triethyl aluminum as a cocatalyst, hydrogen as a molecular weight modifier, and cyclohexyl methyl dimethoxy silane as an external electron donor) were also added, wherein the molar ratio of the triethyl aluminum to the catalyst based on aluminum to magnesium was 4.0:1, and the molar ratio of the cyclohexyl methyl dimethoxy silane to the triethyl aluminum based on aluminum to silicon was 25:1. Liquid propylene was continuously added, and propylene polymerization occurred at 80° C. under 2.9 MPa. The adding amount of hydrogen was adjusted such that the melt index of the polymer obtained was 3.0 g/10 min, and the screening result of the polymer powder obtained was listed in Table 1.

Example 2

Polymerization was carried out according to the method of Example 1 under the same conditions with the following exceptions: decane was used as the dispersing medium, and was mixed with the solid catalyst at 80° C.; the concentration of the solid catalyst in the mixed slurry was 20 wt %; and the weight ratio of the liquid propylene to the mixed slurry was 3:1. The screening result of the polymer powder obtained was listed in Table 1.

Example 3

Polymerization was carried out according to the method of Example 1 under the same conditions with the following exceptions: heptane was used as the dispersing medium, and was mixed with the solid catalyst at 60° C.; the concentration of the solid catalyst in the mixed slurry was 40 wt %; and the weight ratio of the liquid propylene to the mixed slurry was 10:1. The screening result of the polymer powder obtained was listed in Table 1.

Comparative Example 1

Polymerization was carried out according to the method of Example 1 under the same conditions except that white oil was not used but was entirely replaced by liquid propylene. The screening result of the polymer powder obtained was listed in Table 1.

Comparative Example 2

Polymerization was carried out according to the method of Example 2 under the same conditions except that decane was not used but was entirely replaced by liquid propylene. The screening result of the polymer powder obtained was listed in Table 1.

Comparative Example 3

White oil was used to prepare a mixed slurry having a catalyst concentration of 30 wt % by the method of Example 1. Instead of further adding liquid propylene to be mixed with the mixed slurry and thus to prepare a suspension of solid catalyst, the mixed slurry was directly introduced into the polymerization reactor. Polymerization was carried out under the same conditions as those in Example 1, and the screening result of the polymer powder obtained was listed in Table 1.

TABLE 1

| Particle size distribution | Example 1 | Example 2 | Example 3 | Comparative Example 1 | Comparative Example 2 | Comparative Example 3 |
|---|---|---|---|---|---|---|
| >2.00, wt % | 0.1 | 0.1 | 0.1 | 0.1 | 0.1 | 1.8 |
| 1.00-2.00 mm, wt % | 5.9 | 5.7 | 5.5 | 4.1 | 4 | 5.2 |
| 0.50-1.00 mm, wt % | 83.3 | 83.2 | 82.7 | 75.3 | 73.2 | 77.9 |
| 0.355-0.50 mm, wt % | 7.3 | 7.7 | 8.3 | 11.6 | 12.8 | 8 |
| 0.25-0.355 mm, wt % | 1.6 | 1.6 | 1.7 | 3.9 | 4.3 | 3.8 |
| 0.18-0.250 mm, wt % | 0.7 | 0.5 | 0.5 | 2.5 | 2.8 | 1.2 |
| <0.18 mm, wt % | 1.1 | 1.2 | 1.2 | 2.5 | 2.8 | 2.1 |

It can be seen from Table 1, the polymer powders obtained according to the present disclosure had homogeneous particle size distribution. More than 96% of the particles obtained had a size ranged from 0.50 to 2.00 mm. From comparisons between the examples and comparative examples, especially between Example 1 and Comparative Example 1, and between Example 2 and Comparative Example 2, it was evident that the content of fine powder (<0.18 mm) in the polymer powder obtained according to the present disclosure was reduced by more than 50%. Thus, long-term adhesion and thus scale deposition of the fine powder on tube walls, in corners, etc. can be favorably prevented, which is beneficial for long-term operation of the production apparatus, and for further production of propylene copolymers. In addition, the content of large particles in the polymer powder obtained according to the present disclosure was also reduced. For example, the content of coarse particles (>2.00 mm) in the polymer powder obtained according to any example of the present disclosure was far less than that of coarse particles in the polymer powder obtained in Comparative Example 3. Therefore, agglomeration does not easily occur according to the present disclosure, which benefits stable and safe operation of the production apparatus. Hence, by means of the method or in the catalyst suspension thus obtained according to the present disclosure, the solid catalyst component is homogeneously dispersed into the liquid medium, which ensures that the catalyst can be introduced into the polymerization reactor in a stable, continuous, tiny, and quantitative flow. The polymerization apparatus can thus be stably and safely operated in a long term.

The advantage of the present disclosure further lies in that the catalyst storage tank of an existing propylene polymerization apparatus can be directly used for mixing to prepare a suspension of a solid catalyst component, by which the solid catalyst component can readily be dispersed in a homogeneous manner without an additional mixer. That is, revamping of the polymerization apparatus and additional costs are unnecessary. The new method that can be implemented in an existing industrial production apparatus has prominent practical and economical significances in production.

While preferred embodiments of the present disclosure are described above in detail, the detailed description should not be construed as limitations of the present disclosure. The technical solution of the present disclosure can comprise multiple simple variations within the scope of the technical design of the present disclosure. These simple variations should be all within the scope of the present disclosure. It should be further noted that the specific technical features described above in the specific embodiments can be combined in any manner as long as no conflict arises. In order to avoid unnecessary repetition, possible combinations of the present disclosure will not be further described herein. In addition, different embodiments of the present disclosure can also be combined in any manner and the resulting combinations should be considered as disclosed by the present disclosure also so long as they do not violate the idea of the present disclosure.

The invention claimed is:

1. A stable suspension of a solid catalyst component used in propylene polymerization, wherein said suspension comprises said solid catalyst component and a liquid medium containing propylene and an alkane for dispersing said solid catalyst component.

2. The stable suspension according to claim 1, wherein said alkane comprises at least one selected from $C_6$-$C_{100}$ alkanes.

3. The stable suspension according to claim 1, wherein said alkane is white oil.

4. The stable suspension according to claim 1, wherein the weight ratio of the propylene to the alkane is in the range from 0.1:1 to 45:1.

5. The stable suspension according to claim 1, wherein the weight ratio of the solid catalyst component to the alkane is in the range from 1:0.5 to 1:20.

6. The stable suspension according to claim 1, wherein said solid catalyst component comprises magnesium, titanium, a halogen, and an internal electron donor, which is at least one selected from the group consisting of aliphatic ethers, cycloaliphatic ethers, aliphatic ketones, and monobasic acid esters or polybasic acid esters formed from aliphatic or aromatic carboxylic acids.

7. A method for preparing a stable suspension of a solid catalyst component used in propylene polymerization, comprising dispersing said solid catalyst component into a liquid medium containing propylene and an alkane to form the stable suspension.

8. The method according to claim 7, comprising the steps of:
   1) mixing the solid catalyst component and a dispersant which contains the alkane to form a mixed slurry, the alkane accounting for more than 98% by of said dispersant; and
   2) mixing said mixed slurry and liquid propylene to form said suspension.

9. The method according to claim 7, comprising the steps of:
   1) adding a mixed slurry of the solid catalyst component and the alkane directly into a catalyst storage tank of a propylene polymerization apparatus, or adding said solid catalyst component and the alkane respectively into the catalyst storage tank of the propylene polymerization apparatus and mixing the same to obtain the mixed slurry; and 2) adding liquid propylene which is to be mixed with the mixed slurry to obtain said suspension.

10. The method according to claim 8, wherein said alkane comprises at least one selected from $C_6$-$C_{100}$ alkanes.

11. The method according to claim 8, wherein the weight ratio of the propylene to the alkane is in the range from 0.1:1 to 45:1.

12. The method according to claim 8, wherein the weight ratio of the solid catalyst component to the alkane is in the range from 1:0.5 to 1:20.

13. The method according to claim 8, wherein the mixing temperature in step 1) ranges from 30 to 90° C.

14. The method according to claim 9, wherein the mixing temperature in step 1) ranges from 30 to 90° C.

15. The method according to claim 8, wherein a concentration of the solid catalyst component in the mixed slurry obtained in step 1) ranges from 20 to 40 wt %, and a weight ratio of the propylene to the mixed slurry in step 2) ranges from 3:1 to 10:1.

16. A method for propylene polymerization, comprising the steps of:
   a) mixing a solid catalyst component and a dispersant which contains an alkane to form a mixed slurry, the alkane accounting for more than 98% by weight of said dispersant;
   b) mixing said mixed slurry and liquid propylene to form a stable suspension;
   c) introducing the stable suspension into a propylene polymerization system;
   d) adding an aluminum alkyl compound and an external electron donor into the system; and
   e) initiating propylene polymerization under polymerization conditions.

17. The method according to claim 16, wherein the weight ratio of the propylene to the alkane is in the range from 0.1:1 to 45:1.

18. The method according to claim 16, wherein a concentration of the solid catalyst component in the mixed slurry of step a) ranges from 20 to 40 wt %, and a weight ratio of the propylene to the mixed slurry in step b) ranges from 3:1 to 10:1.

19. The method according to claim 16, wherein said polymerization conditions comprise a temperature in the range from 0 to 150° C. and a pressure in the range from 0.1 to 10 MPa.

20. The method according to claim 16, wherein said aluminum alkyl compound is at least one selected from the group consisting of compounds having a general formula of $AlR^1_n X^1_{3-n}$, with "n" equaling 2 or 3, "$R^1$", identical to or different from one another, being hydrogen or a $C_1$-$C_{20}$ straight or branched alkyl group, and "$X^1$" being a halogen; and wherein said external electron donor is at least one selected from the group consisting of compounds having a general formula of $R^2_p Si(OR^3)_{4-p}$, with "p" as an integer in the range from 0 to 3, "$R^2$", identical to or different from one another, being selected from the group consisting of $C_1$-$C_{10}$ straight or branched alkyl groups, substituted or unsubstituted $C_3$-$C_{10}$ cyclic hydrocarbyl groups, substituted or unsubstituted $C_6$-$C_{12}$ aryl groups, and $C_1$-$C_{10}$ halogenated alkyl groups, and "$R^3$", identical to or different from one another, being selected from the group consisting of halogens, hydrogen, $C_1$-$C_{10}$ straight or branched alkyl groups, substituted or unsubstituted $C_3$-$C_{10}$ cyclic alkyl groups, substituted or unsubstituted $C_6$-$C_{12}$ aryl groups, and $C_1$-$C_{10}$ halogenated alkyl groups.

* * * * *